United States Patent

Hagenhoff et al.

[11] Patent Number: 5,833,207
[45] Date of Patent: Nov. 10, 1998

[54] SUPPORTS FOR TRANSFORMERS OR OTHER EQUIPMENT

[75] Inventors: John B. Hagenhoff, Jefferson City, Mo.; John Alesi, Dunwoody; Robert L. Browning, Atlanta, both of Ga.

[73] Assignees: Formex Manufacturing, Inc., Lawrenceville, Ga.; ABB Power T&D Company, Inc., Raleigh, N.C.

[21] Appl. No.: 729,636

[22] Filed: Oct. 21, 1996

[51] Int. Cl.⁶ ...................................................... F16M 1/00
[52] U.S. Cl. ......................... 248/678; 108/51.1; 108/901; 248/346.01
[58] Field of Search ..................... 248/678, 679; 248/346.01; 108/51.1, 901; 336/65

[56] References Cited

U.S. PATENT DOCUMENTS

| | | |
|---|---|---|
| Re. 31,134 | 1/1983 | Lux, Jr. ............................... 248/679 X |
| 3,342,447 | 9/1967 | Marsh . |
| 3,636,888 | 1/1972 | Angelbeck et al. ................. 108/901 X |
| 3,841,032 | 10/1974 | Grannis, III .............................. 336/65 |
| 3,962,660 | 6/1976 | Duckett .............................. 248/678 X |
| 4,023,755 | 5/1977 | Alesi, Jr. ............................... 336/65 X |
| 4,050,659 | 9/1977 | McCannon et al. . |
| 4,056,251 | 11/1977 | Dixon et al. ......................... 336/65 X |
| 4,191,522 | 3/1980 | Turner . |
| 4,212,446 | 7/1980 | Domanick et al. ...................... 248/678 |
| 4,267,399 | 5/1981 | Lux, Jr. .......................... 248/346.01 X |
| 4,399,975 | 8/1983 | Trimarco . |
| 4,505,449 | 3/1985 | Turner et al. . |
| 4,869,456 | 9/1989 | Jacobs . |
| 4,883,918 | 11/1989 | Browning .............................. 336/65 X |
| 4,970,043 | 11/1990 | Doan et al. . |
| 5,020,667 | 6/1991 | Bush .................................. 108/51.1 X |
| 5,076,534 | 12/1991 | Adam . |
| 5,133,276 | 7/1992 | Alesi, Jr. et al. . |
| 5,209,968 | 5/1993 | Sweeney . |
| 5,268,226 | 12/1993 | Sweeney . |
| 5,333,830 | 8/1994 | Millen . |
| 5,401,456 | 3/1995 | Alesi et al. . |
| 5,453,236 | 9/1995 | Daly . |

OTHER PUBLICATIONS

Section 4.3 of American National Standard C57.12.28 (1988).
Excerpt from the Bramec 1996 Master Catalog (two pages).
Brochure of Carson–Brooks Plastics, Inc. entitled "Dura-Grid Condenser Pads" (four pages; undated).
Brochure of Carson–Brooks Plastics, Inc. entitled "Durability in Structural Foam Products" (one page; undated).
Five photographs of a DuraGrid product of Carson–Brooks Plastics, Inc.
Brochure of Hefco Plastics, Inc. entitled "Come Over to Our Pad Hef–T–Pad" (two pages; undated).
Brochure of Hefco Plastics, Inc. entitled "Hef–T–Pad" (four pages; undated).
Six photographs of a Hef–T–Pad product of Hefco Plastics, Inc.
Promotional Literature of Gaia Technologies, Inc. entitled "The Black Pad" (three pages; mentions printing date of Oct. 23, 1995).
Excerpt from the Diversitech 1995 List Price Catalog (five pages).
Brochure of Diversitech entitled "Only concrete looks like concrete" (two pages; undated).
Brochure of Diversitech entitled "Diversitech's A/C Condensate Drain Pans" (two pages; undated).

*Primary Examiner*—Leslie A. Braun
*Assistant Examiner*—Derek J. Berger
*Attorney, Agent, or Firm*—Dean W. Russell; Kilpatrick Stockton LLP

[57] ABSTRACT

A support or pad for equipment, especially electrical transformers, is disclosed. The pad is designed to permit multi-directional access to its underside; consequently, it need not be positioned specially once a transformer is mounted to it, but rather is accessible in almost any upright orientation to the tines of a fork-lift truck. In some embodiments the tine-receiving recesses do not abut an opening for electrical cables attached to the transformer, the opening instead being bordered by sections of the full depth of the pad. The multiple recesses of the pad thus fail to communicate with the opening, blocking any path along the underside from the periphery of the pad to the cable opening itself.

19 Claims, 4 Drawing Sheets

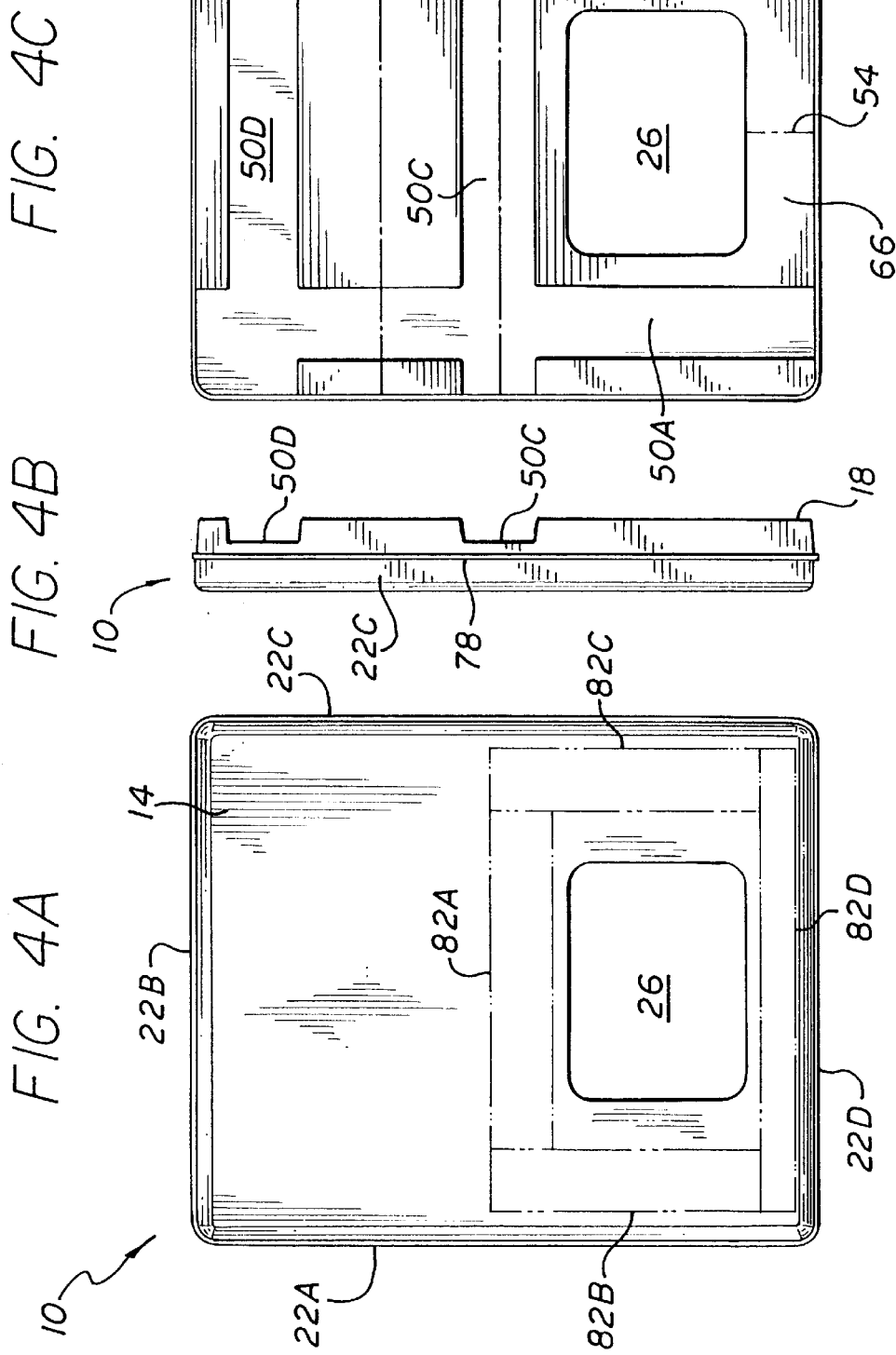

SUPPORTS FOR TRANSFORMERS OR OTHER EQUIPMENT

FIELD OF THE INVENTION

The present invention relates to equipment supports or platforms and in particular to pre-formed pads or similar structures on which industrial equipment including electrical transformers can be mounted.

BACKGROUND OF THE INVENTION

Underground electrical service is now prevalent throughout at least the United States. Whereas formerly electricity was typically provided through wiring strung along above-ground poles, it presently is often supplied through buried cables. Utilizing underground cables for electrical service enhances the appearance of (especially) residential neighborhoods by eliminating the unattractive poles and overhead wiring that otherwise would be present. However, it also prevents use of pole-mounted transformers for, typically, reducing the voltage supplied from the overhead wiring to an individual neighborhood, building, or residence. Instead, such electrical transformers are now placed on the surface of the ground.

To avoid direct physical contact with the earth, these transformers usually are mounted atop pads or similar platforms. Many mounting pads are made of concrete, functioning to isolate the transformer from contaminants such as dirt, debris, and moisture typically present on the adjacent ground. The pads additionally may dampen at least some ground- or equipment-based vibrations, diminishing the likelihood of damage caused by the vibrations to the mounted transformer, and decrease or prevent settling of the transformer into the soil itself. These concrete-containing pads are in many instances both difficult and expensive to create, however, as substantial human effort on-site is necessary to pour the concrete in a manner accommodating the underground cables. While suitable pre-cast concrete bases may be less expensive to construct, their weight and brittleness likely increase transportation-related difficulties and costs.

U.S. Pat. No. 3,962,660 to Duckett describes, at column 1, lines 52–59, an alternative pad of a polyethylene plastic which "can be combined with a bituminous material for increased strength." According to the Duckett patent, "castable material such as concrete and asphalt with appropriate fillers can also be used." U.S. Pat. No. 4,267,399 to Lux, Jr. similarly discloses (at column 3, lines 56–61) alternatives to the earliest conventional pads in which plastic foam and metal or wood strengtheners fill a casing made of plastic, concrete, or fiberglass. Other commercially-available pads likewise use internal steel bars or plates for reinforcement. Although considered in the industry as significant improvements over wholly-concrete platforms, these pads nonetheless may retain substantial weight (if, for example, concrete fillers or shells are employed) or structurally degrade in use (particularly if sufficient moisture leakage into them occurs to rust the metal strengtheners).

The Duckett and Lux, Jr. patents additionally illustrate the opening typically present in each transformer mounting pad. As shown particularly in FIG. 3 of the Duckett patent and FIG. 1 of the Lux, Jr. patent, these openings permit passage of the buried electrical cables from the ground to the transformer terminals. After the cables are electrically connected to the terminals and the transformer prepared for use, a cover (usually formed of metal or composite material) is utilized to enclose both the transformer and the electrical cables.

Any gap present between the frame surrounding the transformer and either the cover or pad admits entry into the interior of the cover and frame, however. Children in particular may be tempted to insert objects, including wire, into existing gaps, thereby subjecting them to hazards arising from contacting high-voltage electrical cables. Numerous attempts consequently have been made to reduce risks associated with these hazards, including adding to pads integrally-formed ridges surrounding portions of the openings (consistent with the disclosure of the Duckett patent) or separate sleeves within the openings extending above their upper surfaces. As described at column 2, lines 38–41 of the Duckett patent, the ridges protruding from the upper surface of each pad are designed to engage the inside surface of the associated cover and thereby create an entry barrier for wires or other contraband. By contrast, the sleeves of the Lux, Jr. patent intercept and appropriately deflect any wires actually inserted in any gap. U.S. Pat. No. 4,883,918 to Browning, incorporated herein in its entirety by this reference, discloses another device for shielding the electrical cables from contraband articles inserted under the frame of a transformer. Also in the form of a frame (or shield), the device of the Browning patent is adapted for installation without requiring disconnection of cables from the terminals of the transformer.

None of these patents describes a transformer mounting pad designed to provide multi-directional access to its underside yet resist tampering in use. For example, although the Duckett patent discloses "slots" in the underside of a pad for receiving the tines of a fork-lift truck, only a single pair of such slots—opening to only one side of the pad—exists. Moreover, because the slots communicate with a recessed area of the underside (into which the ridge of a second pad nests for shipping) adjacent the cable opening, they provide direct, linear paths from the pad periphery to the opening for insertion of wires or other hazardous objects. As a result, the pad of the Duckett patent is not suitable for situations in which any side might be presented to the tines of a fork-lift truck, nor is it especially useful in reducing the danger of electrical shock to those attempting to tamper with its associated transformer. The sloping nature of the slots additionally makes burying them difficult, increasing the possibility that at least a portion of them will remain sufficiently above ground to permit introduction of a wire or similar material.

SUMMARY OF THE INVENTION

The present invention provides a pad designed to permit multi-directional access to its underside. Contrasted with that of the Duckett patent, for example, the pad of the present invention is adapted to receive fork-lift tines entering from any of its (nominally) four sides. As a result, it need not be positioned specially once a transformer is mounted to it, but rather is accessible in almost any upright orientation to the tines of a fork-lift truck utilized to transport the pad in preparation for shipping. No separate pallet is thus necessarily used to ship the transformer to its ultimate destination, minimizing time and waste of the associated installation process performed on-site.

In some embodiments of the invention, the tine-receiving recesses do not abut the cable opening. Instead, the opening is bordered by sections whose depth is not decreased, effectively surrounding the opening with the full depth of the pad. Unlike the single pair of slots of the Duckett patent, therefore, the multiple recesses of the present invention fail to communicate with the opening, blocking any path along the underside from the periphery of the pad to the cable opening itself. Furthermore, because the tine-receiving recesses are of constant depth, they do not inhibit burying the underside of the pad. Instead, the tine-receiving recesses tend to collect or accumulate soil uniformly, constraining lateral and rotational movement of the pad (and thereby "locking" it in place) once positioned for use.

Embodiments of the present pad contemplate use of polyethylene to encapsulate a solid polystyrene (or other) foam core. Those skilled in the art will, of course, recognize that other materials may be used for both the core and shell of the pad. However, by omitting from the pad concrete casings and both concrete and bituminous fillers, the invention provides a relatively lightweight product that facilitates manufacturing and shipping. It nonetheless has sufficient strength to support existing electrical transformers in use, regardless of whether reinforcing materials are employed. Avoiding steel and other degradable fillers additionally decreases the possibility of structural failure caused by rusting or similar degradation of them.

If appropriate or desired, one or more polyethylene (or other) strips may be included within the casing of the pad. When present, such strips may act as mounts for the transformer housing, drawing the frame of the transformer to the upper surface of the pad to avoid (or at least minimize) any gaps between them that otherwise might exist. Alternatively, recesses may be molded into the pad to receive bolts connecting the upper surface of the pad to the frame.

It is thus an object of the present invention to provide an equipment support having multi-directional access to its underside.

It is also an object of the present invention to provide an equipment support adapted to facilitate its shipment with an electrical transformer mounted to it.

It is an additional object of the present invention to provide an equipment support having an opening through which cables may pass in use but which is not bordered by any slots or other recessed portions.

It is another object of the present invention to provide an equipment support in which recesses of substantially uniform depth are present in its underside, the recesses available to receive tines of fork-lift trucks prior to installation and designed to collect or accumulate soil in use.

It is a further object of the present invention to provide a transformer mounting pad or other support that omits use of concrete in favor of lightweight materials such as polyethylene encapsulating a polystyrene foam core.

It is yet another object of the present invention to provide an equipment support incorporating one or more polyethylene or other strips into the casing of the support.

Other objects, features, and advantages of the present invention will be apparent with reference to the remainder of the text and to the drawings of this application.

BRIEF DESCRIPTION OF THE DRAWINGS

FIG. 4A is a top plan view of the support of FIG. 1.

FIG. 4B is a side elevational view of the support of FIG. 4A.

FIG. 4C is a bottom plan view of the support of FIG. 4A.

DETAILED DESCRIPTION

FIGS. 1–5 illustrate support or pad 10 of the present invention. As shown in these figures, pad 10 has an upper surface 14, a lower surface 18, and sides 22A–D connecting upper and lower surfaces 14 and 18. Upper surface 14 typically is rectangular in shape, although those skilled in the art will recognize that it need not be so shaped if necessary or desired.

Figure 1:
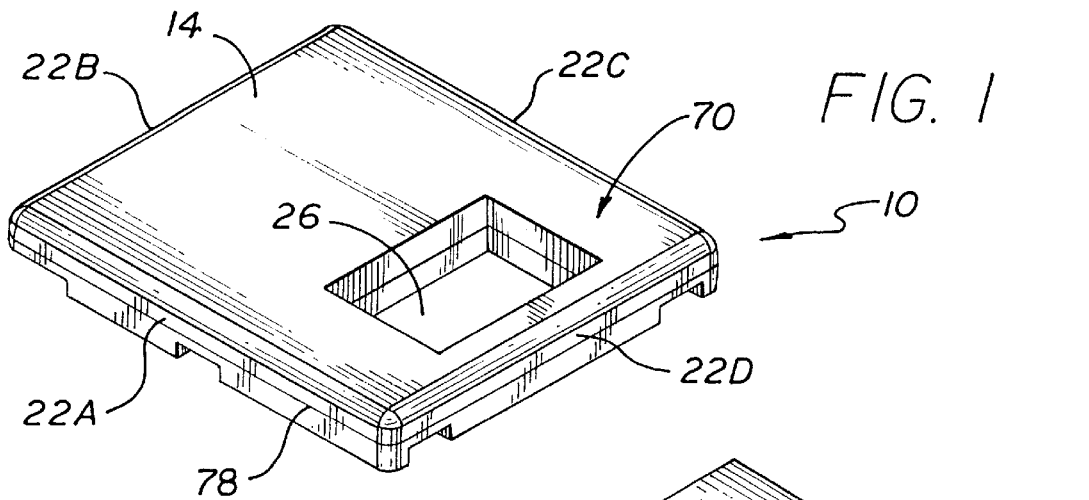
FIG. 1 is an isometric view of an equipment support of the present invention.
Figure 2:
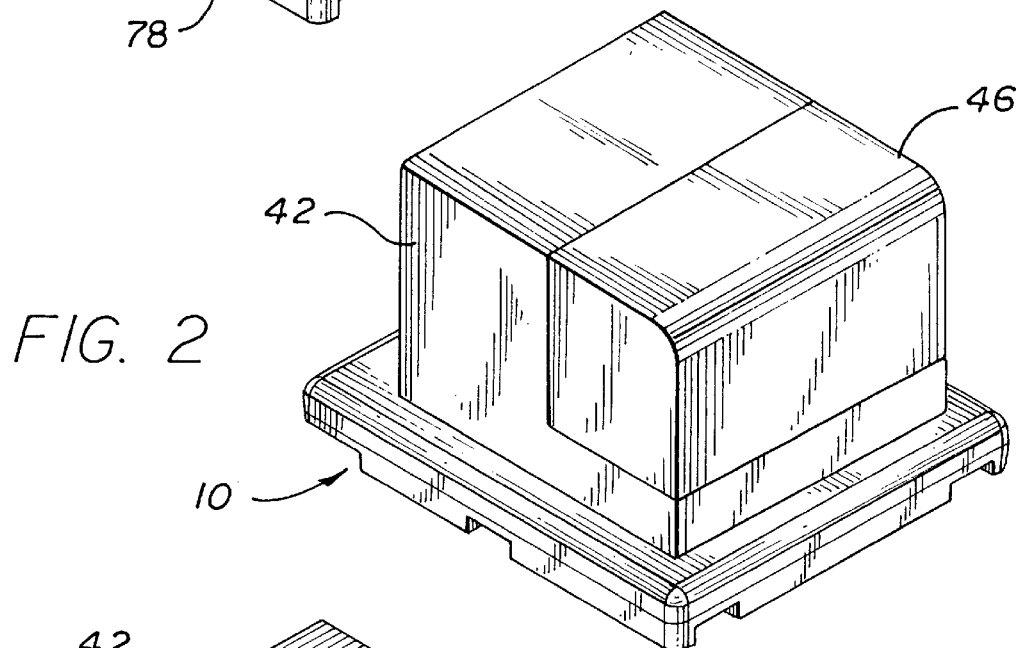
FIG. 2 is an isometric view of the support of FIG. 1 on which an electrical transformer has been mounted.
Figure 3:
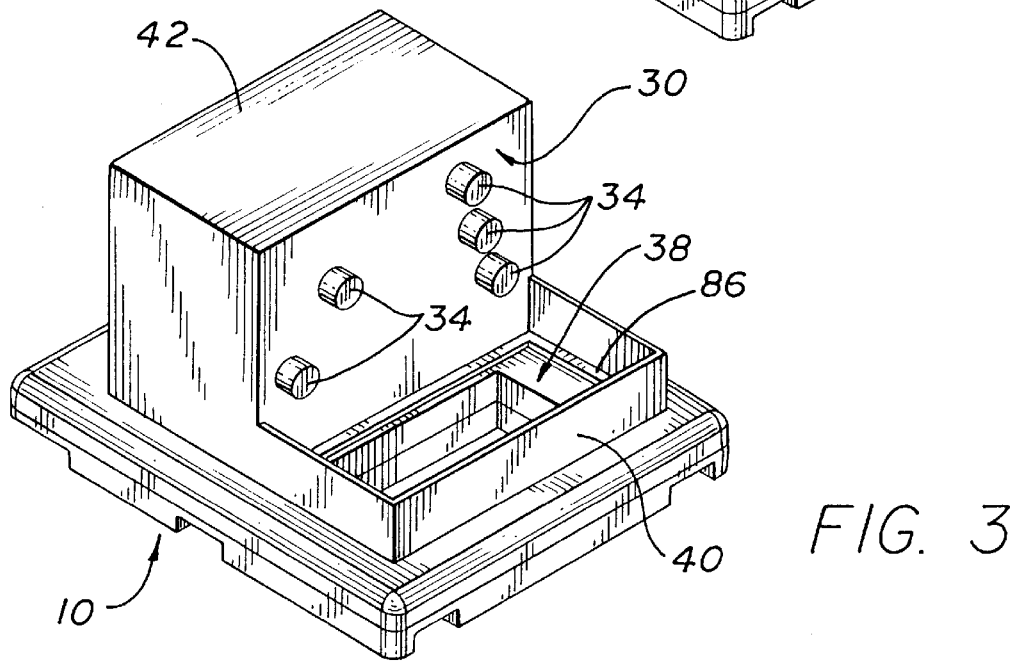
FIG. 3 is an isometric view of the support and transformer of FIG. 2 with a portion of the cover of the transformer removed.
Figure 4D:
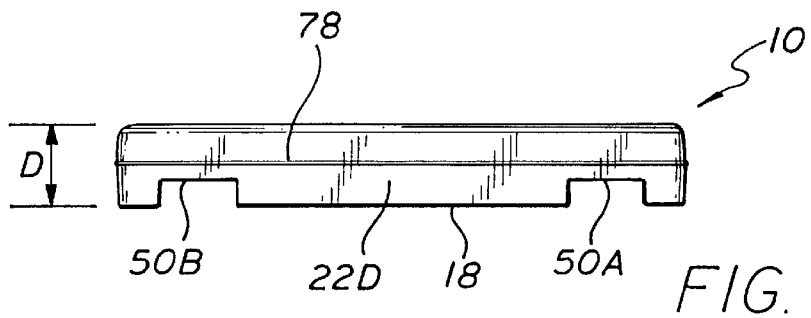
FIG. 4D is an end elevational view of the support of FIG. 4A.
Figure 5A:
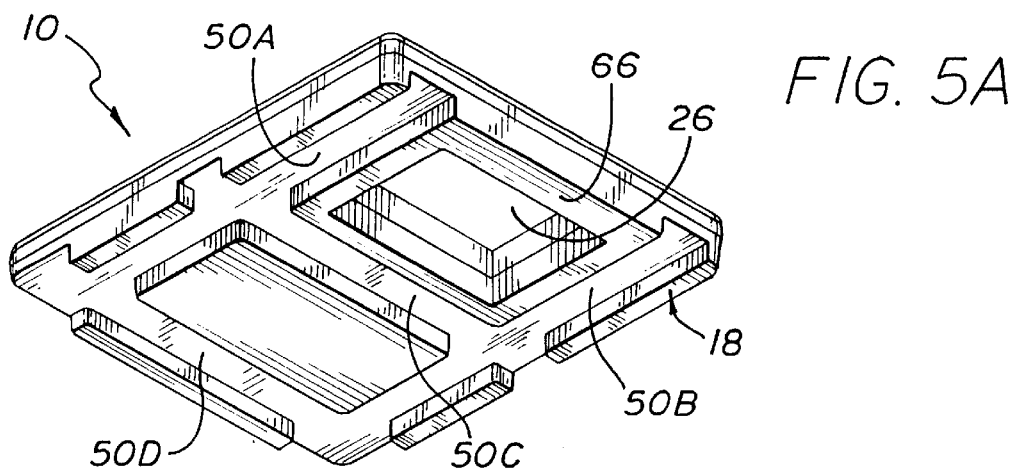
FIG. 5A is an isometric view of the underside of the support of FIG. 1.
Figure 5B:
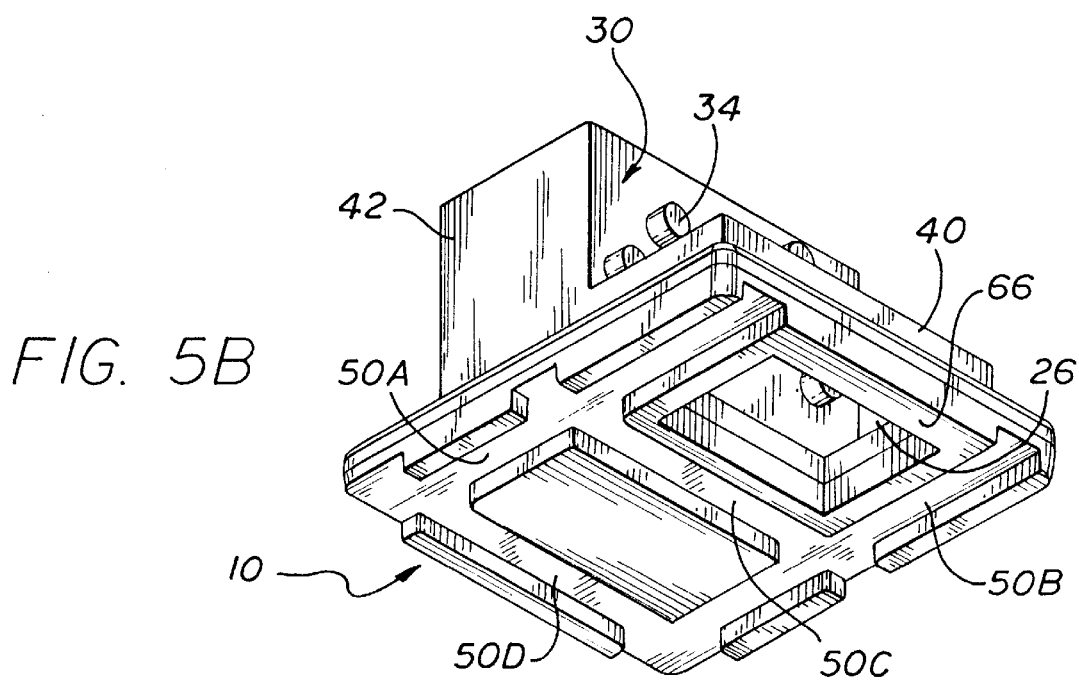
FIG. 5B is an isometric view of the underside of the support and of the transformer of FIG. 2 with a portion of the cover of the transformer removed.

Extending the depth D of pad 10 is opening 26. When pad 10 is used for mounting a transformer 30, opening 26 permits passage of buried electrical cables from the earth to the terminals 34 of the mounted transformer 30. FIG. 3 details alignment of opening 26 with hollow section 38 of frame 40 and housing 42 of transformer 30, allowing the electrical cables to be brought through opening 26 into section 38 for attachment to terminals 34. After the cables are so attached, cover 46 may be assembled as part of housing 42 to enclose transformer 30, the cables, and terminals 34. In many cases cover 46 is attached to housing 42 via hinges and thus need merely be rotated closed (as in FIG. 2) after the cables are connected to terminals 34. In any event, housing 42 and cover 46 are designed to prevent access to terminals 34 and the cables within section 38 when transformer 30 is in use to reduce the possibility of someone (or something) contacting them and receiving an electrical shock.

Shown particularly in FIGS. 4B–D and 5A–B are channels 50A–D of lower surface 18. Channels 50A and 50B are formed longitudinally in pad 10, extending in the embodiment of FIGS. 1–5 from side 22B to side 22D. By contrast, channels 50C and 50D extend from side 22A to side 22C of pad 10, intersecting channels 50A and 50B at right angles. Each of channels 50A–D is of uniform depth and sufficiently wide to permit receipt of a tine of a fork-lift truck. Because a pair of parallel channels extends to each of sides 22A–D, underside 18 of pad 10 is adapted to receive the tines of a fork-lift truck entering from any of sides 22A–D. Channels 50A–D thus effectively provide "four-way" entry for the tines, obviating the need to position pad 10 specially vis-a-vis a fork-lift truck.

This feature of pad 10 is particularly useful when transformer 30 is mounted to the pad 10 prior to shipment to a field site, as the (heavy) assembly is accessible in almost any upright orientation to the tines of the truck used to transport pad 30 in preparation for shipping. No separate pallet or other device is thus needed to ship transformer 30 to the field, minimizing time and waste of the associated on-site installation process. Because the mass of transformer 30 is (generally) symmetrically distributed about longitudinal center line 54 of pad 10, channels 50A and 50B likewise are symmetrically positioned about center line 54. By contrast, the weight of transformer 30 is typically not centered about transverse center line 58 of pad 10, but rather about transverse line 62. Hence, channels 50C and 50D are offset from transverse center line 58 so as to be approximately symmetric about transverse line 62.

Additionally significant is that none of channels 50A–D communicates with opening 26. Instead, opening 26 is completely surrounded by an area 66 extending the full depth D of pad 10. Thus, when pad 10 is installed, no path along underside 18 exists between any of channels 50A–D and opening 26. Whereas the slots of the pad of the Duckett patent provide direct access to its corresponding cable opening, channels 50A–D of pad 10 do not, being obstructed in all directions by area 66. Even if channels 50A–D are not buried when pad 10 is installed, therefore, inserting an object in any of them is unlikely to result in the object being guided to the cables passing through opening 26. The structure of pad 10 thereby clearly reduces the possibility of electrical shock in this circumstance over that when the pad of the Duckett patent is employed.

Moreover, the substantially uniform depth of channels 50A–D facilitates their being buried in the earth when pad 10 is installed. During the installation of pad 10, area 66 and other portions of lower surface 18 tend to displace soil, while channels 50A–D tend to collect or accumulate the soil. These features of lower surface 18 effectively lock pad 10 in position relative to the ground, inhibiting lateral and rotational movement of the pad 10 after the installation is complete. This locking effect is enhanced by the perpendicular nature of intersections of channels 50A and 50B with channels 50C and 50D. Because of uniform depth, furthermore, channels 50A–D also tend to collect approximately uniform quantities of soil and thus may be buried uniform amounts while maintaining upper surface 14 approximately level to the ground.

Although pad 10 may be constructed of any suitable material, upper surface 14, lower surface 18, and sides 22A–D of pad 10 typically constitute a polyethylene shell 70. Shell 70 encapsulates core 74 (see, e.g., FIG. 6B), which may be made of solid expanded polystyrene (EPS) foam or other appropriate material. Methods of manufacturing such shell 70 and core 74 are disclosed in U.S. Pat. No. 5,401,456 to Alesi, Jr., et al., which patent is incorporated herein in its entirety by this reference. If shell 70 comprises two sheets of polyethylene per the Alesi, Jr. patent, flange 78 may be formed where the sheets fuse. Furthermore, utilizing as core 74 a solid block of EPS or similar foam fused to the interior of shell 70 minimizes the opportunity for voids to be present within shell 70 in which moisture could collect. Avoiding use of concrete filler within shell 70 also results in a pad 10 which is more lightweight than many transformer supports that are presently available.

FIG. 4A illustrates, in phantom shading, strips 82A–D that may be encapsulated within shell 70. As shown in FIG. 4A strips 82A–D, if present, are designed to be positioned between core 74 and upper surface 14 of shell 70 and to surround at least a portion of opening 26. Consequently, strips 82A–D may receive bolts or other fasteners used to mount frame 40 to pad 10 in the area of opening 26, effectively drawing frame 40 and upper surface 14 together and thereby reducing the possibility that gaps will be present between them. As a result, strips 82A–D can assist in diminishing the likelihood that any attempt to insert a foreign object between frame 40 and upper surface 14 could result in contact with the electrical cables contained within section 38.

Although described in another context, examples of strips 82A–D appear in U.S. Pat. No. 5,133,276 to Alesi, Jr., et al., which also is incorporated herein in its entirety by this reference. Some embodiments of pad 10 contemplate use of strips 82A–D made of polyethylene approximately six inches wide and three hundred mil thick. Such dimensions are not critical, however, and strips 82A–D (if utilized) may be otherwise configured as desired.

Integrally formed as part of frame 40 is flange 86, whose sections correspond and are approximately the same length as strips 82A–D. Alternatively or additionally, strips 82B and 82C may be extended in length so as to terminate adjacent side 22B. In at least some circumstances these extensions are not desirable, however, as extended strips 82B and 82C would then interfere with seating of the knife-edged portions of some transformer housings. If strips 82A–D are not used, the structural integrity of pad 10 may in many situations benefit from having cylindrical recesses (threaded inserts) molded into shell 70 to receive bolts or similar fasteners associated with housing 42.

Unlike many conventional transformer pads whose depths approximate four inches, pad 10 in many embodiments is six inches deep. Making pad 10 thicker than conventional platforms permits channels 50A–D to be approximately two inches deep; if pad 10 is later buried to the depth of channels 50A–D, approximately four inches would still remain above ground to insulate transformer 30 from the earth. In an exemplary version of the invention, pad 10 is approximately 40" wide and 46" long, with opening 26 having dimensions of 20"×14" and area 66 extending at least 2.5" around each side of the opening 26. In this version channels 50A–D are 5.5" wide. Again, however, none of these values is critical to the invention and each may thus be modified as necessary or desired.

Figure 6A:
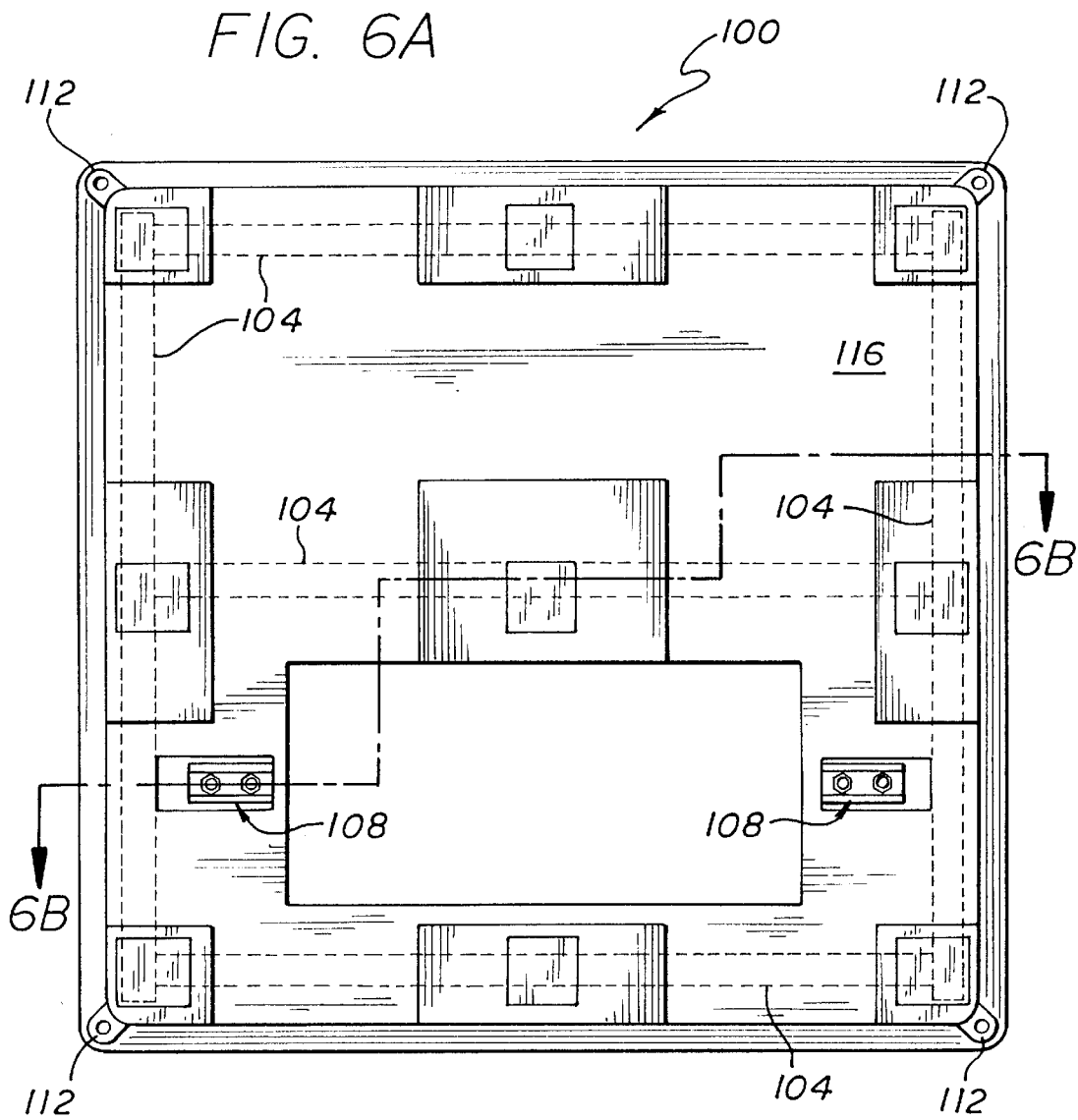
FIG. 6A is a diagrammatic bottom plan view of an alternative embodiment of the equipment support of the present invention.
Figure 6B:
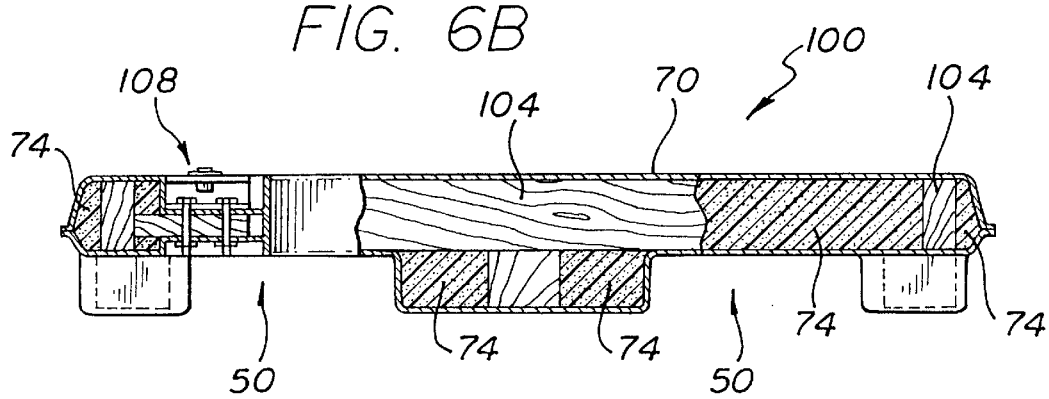
FIG. 6B is a cross-sectional view of the support taken along lines B—B of FIG. 6A.

Another embodiment of the present invention is detailed in FIGS. 6A–B. These drawings illustrate a "four-way" entry pad 100 comprising a shell 70, typically of polyethylene, in which channels 50 are formed. Rather than encapsulating solely EPS or other foam as core 74, however, shell 70 additionally covers wood 104 and mounting assemblies 108. Assemblies 108 may be used to secure housing 42 to the wood 104 for further structural support.

Included in the embodiment of pad 100 shown in FIG. 6A are anchors 112 positioned in the corners of upper surface 116, which are designed to receive spikes, bars, or other means for directly securing pad 10 to the ground when necessary or desired. As noted above, for added protection against tampering, both pad 10 and pad 100 can include a detachable frame or shield such as that described in U.S. Pat. No. 4,883,918 to Browning. Pads 10 and 100 further may be structured so as to comply with section 4.3 of American National Standard C57.12.28 or otherwise modified consistent with the principles disclosed herein. Thus, although the foregoing is provided for purposes of illustrating, explaining, and describing embodiments of the present invention, modifications and adaptations to these embodiments will be apparent to those skilled in the art and may be made without departing from the scope or spirit of the invention.

We claim:

1. A pad for supporting equipment to which at least one electrical cable is connected when in use, comprising:
   a. an upper surface adapted to receive the equipment when in use;
   b. a lower surface spaced apart from the upper surface and at least partially defining a first channel, the distance between the spaced upper and lower surfaces defining the maximum thickness of the pad; and c. an opening extending from the lower surface to the upper surface and through which the cable passes when in use, which opening is surrounded by a first area of the lower surface extending the maximum thickness of the pad and in use does not communicate with the first channel.

2. A pad according to claim 1 further comprising first and second sides connecting the upper and lower surfaces and in which the lower surface additionally defines a second channel, the first channel extending to at least the first side and the second channel extending to at least the second side.

3. A pad according to claim 2 in which the lower surface further defines third and fourth channels, the third channel extending to at least the first side and being parallel to the first channel and the fourth channel extending to at least the second side and being parallel to the second channel.

4. A pad according to claim 3 in which the first and third channels are perpendicular to the second and fourth channels.

5. A pad according to claim 4 further comprising third and fourth sides connecting the upper and lower surfaces to form an enclosure.

6. A pad according to claim 5 further comprising a solid block of foam positioned within the enclosure.

7. A pad according to claim 6 further comprising a mounting strip positioned within the enclosure between the foam and the upper surface.

8. A pad according to claim 7 in which the enclosure and mounting strip are made of polyethylene and the foam is expanded polystyrene.

9. A pad according to claim 1 in which the upper surface has a center and the opening is offset from the center.

10. A pad according to claim 1 in which the upper surface has a plurality of corners and defines at each corner an anchor for securing the pad to the ground in use.

11. A pad according to claim 1 in which:
   a. the lower surface:
      i. is substantially rectangular;
      ii. defines longitudinal and transverse center lines; and
      iii. at least partially defines second, third and fourth channels;
   b. the first and second channels are formed symmetrically about the longitudinal center line; and
   c. the third and fourth channels are formed asymmetrically relative to the transverse center line and perpendicular to the first and second channels.

12. A transformer mounting pad having a thickness and comprising:
   a. an upper surface adapted to receive the transformer when in use;
   b. a lower surface;
   c. a plurality of side walls connecting the upper and lower surfaces;
   d. means, extending to each side wall, for receiving tines of a fork-lift truck;
   e. an opening extending from the lower surface to the upper surface and through which at least one electrical cable may pass to the transformer when in use; and
   f. a first area surrounding the opening, which first area extends the thickness of the pad and separates the opening from the tine-receiving means.

13. A pad according to claim 12 in which the tine-receiving means comprises a plurality of channels.

14. A pad according to claim 13 in which the upper surface, lower surface, and plurality of side walls form an enclosure, further comprising a foam core positioned within the enclosure.

15. A pad according to claim 14 further comprising a mounting assembly at least partially positioned within the enclosure.

16. A pad according to claim 15 in which the mounting assembly comprises a plurality of plastic mounting strips wholly positioned within the enclosure.

17. A pad according to claim 16 in which each of the plurality of channels has uniform depth.

18. A transformer mounting pad having a thickness and comprising:
   a. a substantially rectangular upper surface for receiving the transformer when in use;
   b. a substantially rectangular lower surface defining longitudinal and transverse center lines;
   c. first, second, third, and fourth side walls connecting the upper and lower surfaces to form a housing;
   d. a solid block of foam encapsulated within the housing;
   e. a plurality of plastic mounting strips encapsulated within the housing between the foam and the upper surface;
   f. first and second channels of uniform depth formed in the lower surface symmetrically about the longitudinal center line and extending from the first to the second side;
   g. third and fourth channels of uniform depth formed in the lower surface asymmetrically relative to the transverse center line and extending from the third to the fourth side perpendicular to the first and second channels; and
   h. an opening extending from the lower surface to the upper surface and through which at least one electrical cable may pass to the transformer when in use, the opening separated from the first, second, and third channels by an area having the full thickness of the pad.

19. A pad for supporting equipment to which at least one electrical cable is connected when in use, comprising:
   a. an upper surface adapted to receive the equipment when in use;
   b. a lower surface spaced apart from the upper surface and defining means for receiving tines of a fork-lift truck, the distance between the spaced upper and lower surfaces defining the maximum thickness of the pad; and
   c. an opening extending from the lower surface to the upper surface and through which the cable passes when in use, which opening is surrounded by a first area of the lower surface extending the maximum thickness of the pad and in use does not communicate with the tine-receiving means.

* * * * *